United States Patent [19]

Saito et al.

[11] Patent Number: 4,835,759

[45] Date of Patent: May 30, 1989

[54] METHOD AND APPARATUS FOR COMPENSATING VARIATION OF READ DATA IN AN OPTICAL DATA STORAGE

[75] Inventors: Atsushi Saito, Ichikawa; Takeshi Maeda; Hisataka Sugiyama, both of Kokubunji; Kazuo Shigematsu, Saitama; Wasao Takasugi, Higashiyamato, all of Japan

[73] Assignee: Hitachi, Ltd., Tokyo, Japan

[21] Appl. No.: 878,436

[22] Filed: Jun. 25, 1986

[30] Foreign Application Priority Data

Jul. 3, 1985 [JP] Japan .................................. 60-144751

[51] Int. Cl.$^4$ ............................. G11B 7/00; G11B 5/09
[52] U.S. Cl. ........................................ 369/59; 369/48; 369/124; 360/39
[58] Field of Search ...................... 369/48, 49, 59, 124; 360/39, 45; 375/118

[56] References Cited

U.S. PATENT DOCUMENTS

| | | | |
|---|---|---|---|
| 4,558,441 | 12/1985 | Yokota et al. | 369/59 |
| 4,566,091 | 1/1986 | Gerard et al. | 369/48 |
| 4,583,211 | 4/1986 | Nishikawa et al. | 369/59 |
| 4,607,295 | 8/1986 | Uno | 360/45 |
| 4,612,586 | 9/1986 | Sordello et al. | 360/45 |
| 4,646,103 | 2/1987 | Sugiyama et al. | 369/54 |

*Primary Examiner*—Alan Faber
*Assistant Examiner*—Surinder Sachar
*Attorney, Agent, or Firm*—Antonelli, Terry & Wands

[57] ABSTRACT

When recording domains are formed locally on a recording medium and information is recorded and reproduced by using rise and fall in a reproduced waveform obtained from the recording domains as data, timing patterns indicating start of demodulation are recorded for the lead-edge and the tail-edge of the recording domains, respectively; time interval between the timing signal for starting demodulation detected from the rise in the reproduced waveform and the timing signal for starting demodulation detected from the fall in the reproduced waveform is detected; time shifts of the signals detected from the lead-edge and the tail-edge of the recording domains succeeding the timing patterns for starting demodulation by using the time interval thus detected; and the information is stably detected as time sequential data having no jitter.

5 Claims, 9 Drawing Sheets

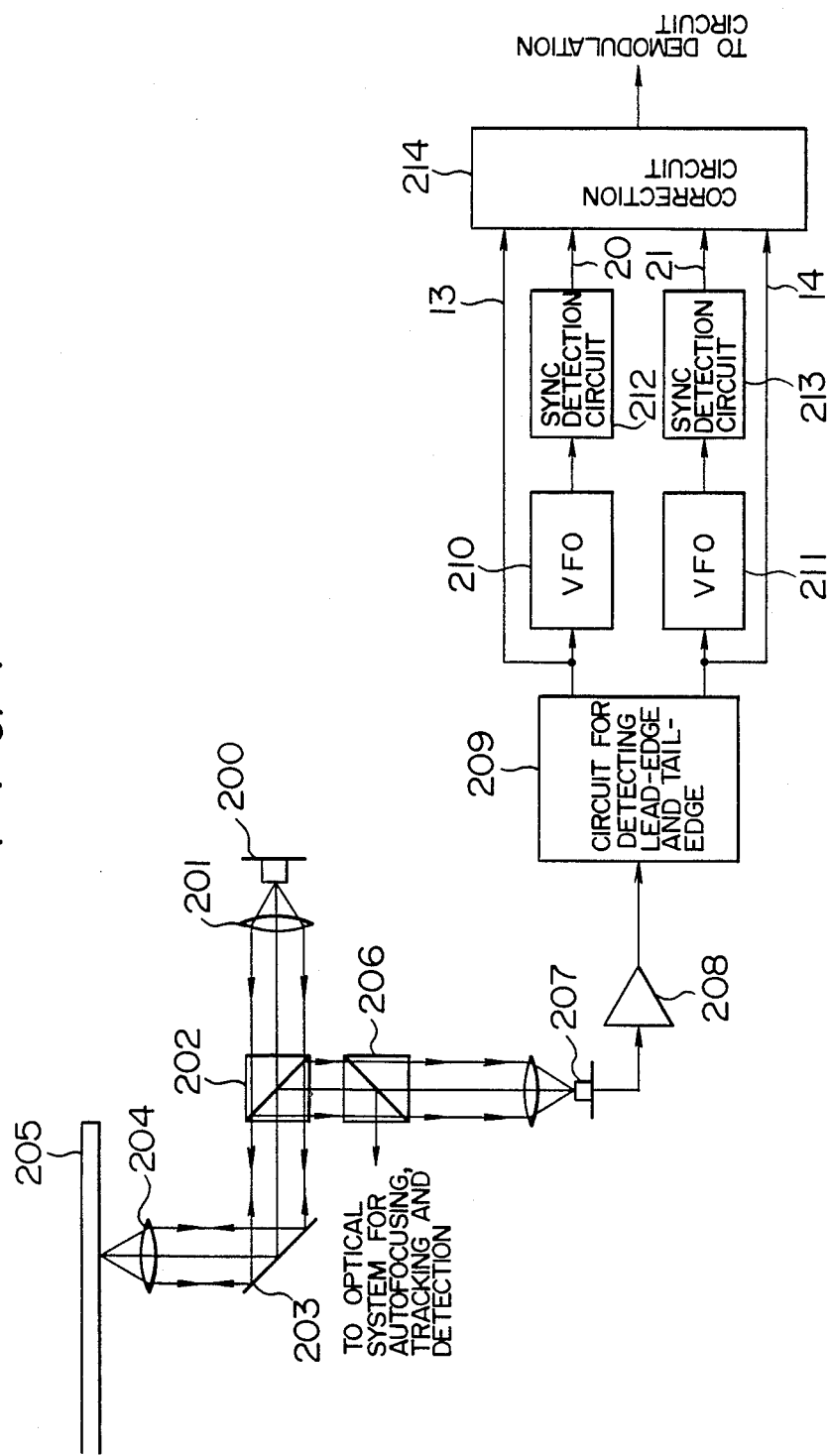

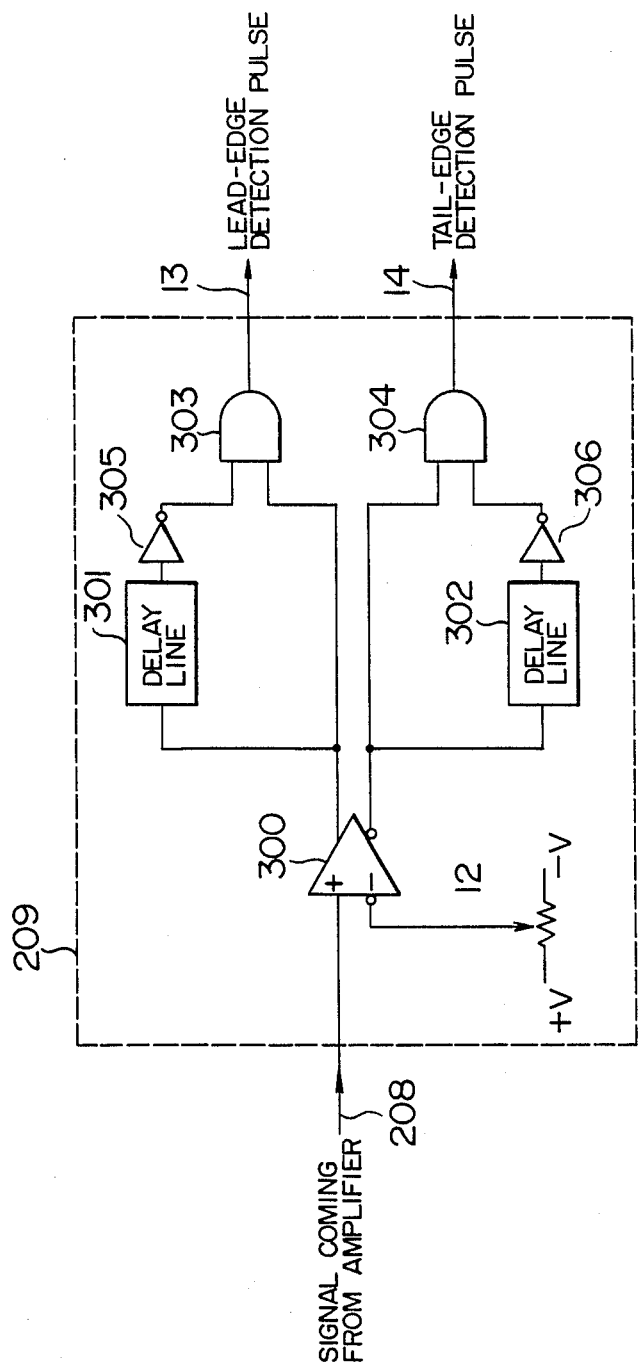

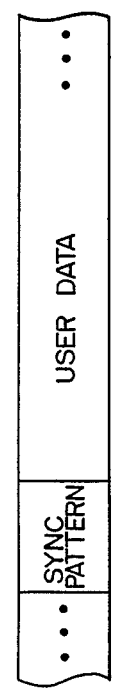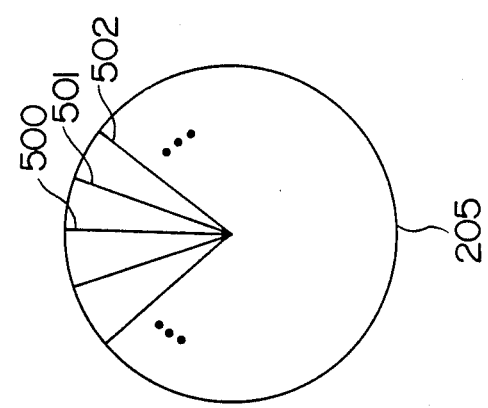

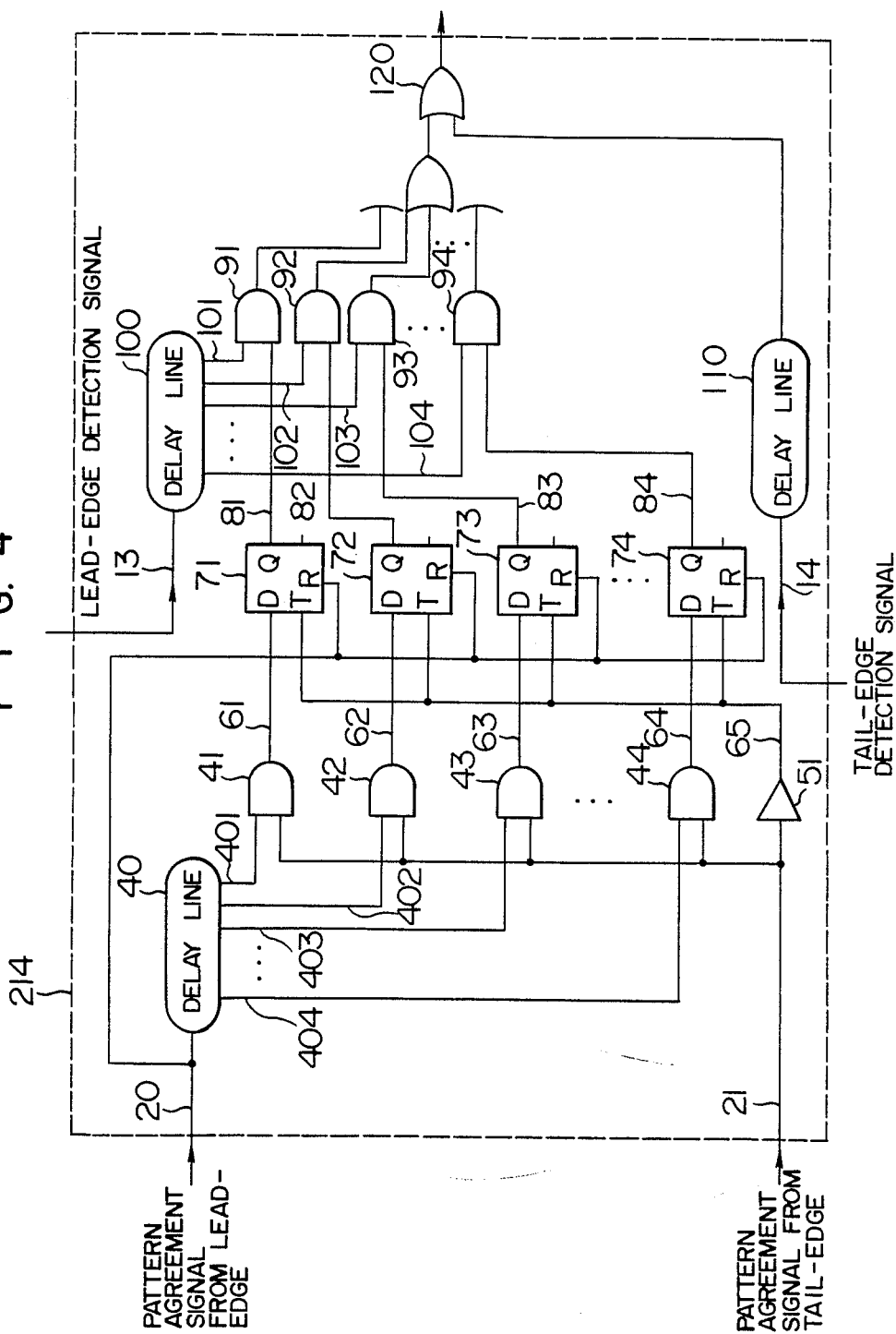

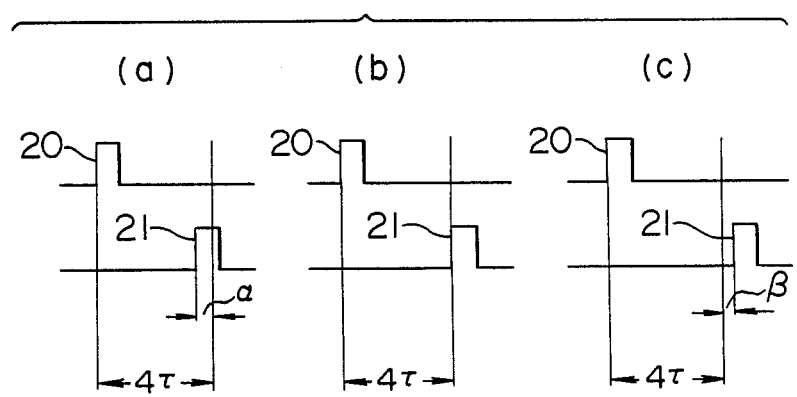

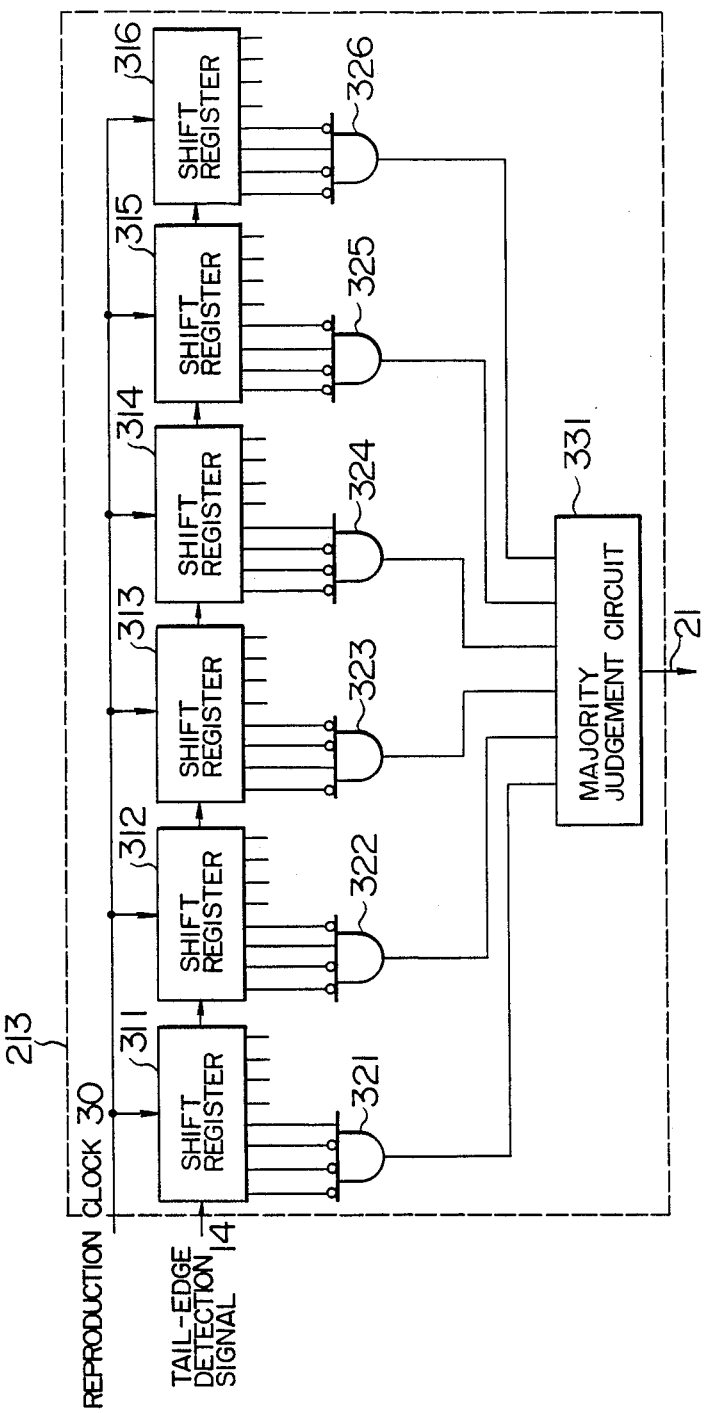

METHOD AND APPARATUS FOR COMPENSATING VARIATION OF READ DATA IN AN OPTICAL DATA STORAGE

CROSS-REFERENCES OF THE RELATED APPLICATIONS

This application relates to an application U.S. Ser. No. 832,887 entitled "Optical Recording Method" and assigned to the present assignee, based on Japanese patent application. Nos. 55832/85 and 54438/85 filed Feb. 26, 1986, now U.S. Pat. No. 4,646,103.

BACKGROUND OF THE INVENTION

This invention relates to a method and an apparatus for recording and reproducing information and in particular to a method and an apparatus for reproducing information suitable to be used in an optical disk device for demodulating recorded information by using the rise and fall of reproduction signal pulses as data.

The method of demodulating data by detecting the rise and fall of the waveform of the reproduction signal can be utilized for a DAD (digital audio disk). The principle of the data demodulation is described e.g. in "Introduction to Video Disk and DAD" by Iwamura (Corona Publishing Co., Japan) pp. 212–215. The demodulation is performed by detecting variation points in the waveform of the reproduction signal (modulated wave), i.e. the lead-edge and the tail-edge of the waveform, and producing a reproductive window therefrom, in order to obtain reproduced data. In the method utilized for DAD, it is the condition, under which correct demodulation is possible, that the width of the reproductive window is T/2, where T denotes a data interval, and that pulses representing variation points are located in a region of ±0.25 T. Consequently, when a zero cross point is varied by noise, distortion, jitter, etc. and it is outside of the reproductive window, an error is produced. Although it is conceivable also for the write-once type optical disk to form data, using the lead-edge and the tail-edge, for the write-once type, since the object disk is directly irradiated with laser light pulses, the thermal energy of which alters locally the recording medium, so that the data is registered in the medium, and since the position of the lead-edge and the tail-edge of formed recording domains (pits or magnetic domains) are strongly influenced by characteristics of the recording medium and jitter, it is apt to be shifted indefinitely. Therefore, it is important to correct edge shift of the lead-edge and the tail-edge during recording by some method.

SUMMARY OF THE INVENTION

The object of this invention is to provide a method and an apparatus for recording and reproducing information, by which data is formed by using the lead-edge and the tail-edge of recording pits, which suppresses influences of slice level variations during reproduction and can detect stably the data in the form of sequential data having no jitter by correcting electrically and automatically the amount of shift from the proper position between the two edges.

In order to achieve the object mentioned above, according to this invention, a timing mark for a starting point (in general called SYNC mark) indicating the starting point (timing) for demodulating information is disposed in the form of a double pattern for the rise and the fall of the reproduced waveform. That is, an identical pattern is recorded for each of the lead-edge and the tail-edge of a recording pit. This invention is suitable to be used in particular for the write-once type optical disk recording of information by forming pits in a recording medium by means. of heat of laser light, but it can be used for information recording/reproduction in a phase transition type optical disk, further a magneto-optical disk, a magnetic disk, etc.

A timing mark for a starting point disposed before a series of data in the recording medium described above at the time of data recording is detected by a detector means for each of the different channels as a pulse detection signal. The reason why the timing mark for a starting point is constituted previously by a double pattern is for obtaining a time difference between the detection signal pulse coming from the lead-edge and that coming from the tail-edge by obtaining them separately. If the recording medium is perfectly ideal, a reproduced waveform, which is analogous to the form of a light pulse used during recording, should be obtained. However, in practice, recording leaves somewhat of a tail after the irradiation with a light pulse has been terminated, due to non-uniformity in heat diffusion in the recording medium, differences in the gradient of temperature rise and fall, and fluctuations in write-sensitivity, for example. Consequently, the gradient of the lead-edge in the reproduced waveform is not in agreement with that of the tail-edge. That is, an edge shift is produced. However, it is confirmed experimentally that the gradient itself of the lead-edge and that of the tail-edge are relatively in agreement with each other.

Consequently, once the edge shift has been corrected by starting from the time difference of the detection signal of the timing mark for the starting point, the same correction value can be applied to a series of data succeeding it. In particular, if the recording medium is sector-controlled, it is possible to increase the reliability by effecting the correction described above for each sector. The method for the correction will be briefly explained below.

The timing mark for a starting point detected from the front edge precedes in time that detected from the tail-edge. Therefore, the timing mark for a starting point detected from the lead-edge is inputted in a delay line and among delayed pulses outputted by the output terminal of the delay line, those which are in time in agreement with detection pulses of the tail-edge, which are not delayed, are selected. By this operation it is possible to obtain the sum of the time difference between the two original detection pulses and an error due to the edge shift. Errors in time in the series of data succeeding the timing mark can be corrected by selecting errors in time due to the edge shift among the time differences thus obtained from output terminals of different delay lines.

BRIEF DESCRIPTION OF THE DRAWINGS

These and other objects of the present invention will become apparent by reference to the following description and accompanying drawings:

FIG. 1 is a scheme illustrating the basic construction of an optical device for realizing this invention;

FIG. 2 shows a circuit diagram for detecting lead-edge and tail-edge;

FIGS. 3(a), (b) and (c) represent a scheme illustrating an example of the data formats;

FIG. 4 is a scheme illustrating the construction of the circuit for correcting edge shifts from the proper position of the detection signal of lead-edge and tail-edge;

FIGS. 5(a), (b) and (c) are schemes illustrating edge shifts between pattern detection signals for starting demodulation from lead-edge and tail-edge;

FIG. 9 is a diagram illustrating an example of circuits for recognizing the patterns indicated in FIG. 8.

DESCRIPTION OF THE PREFERRED EMBODIMENTS

Figure 6:
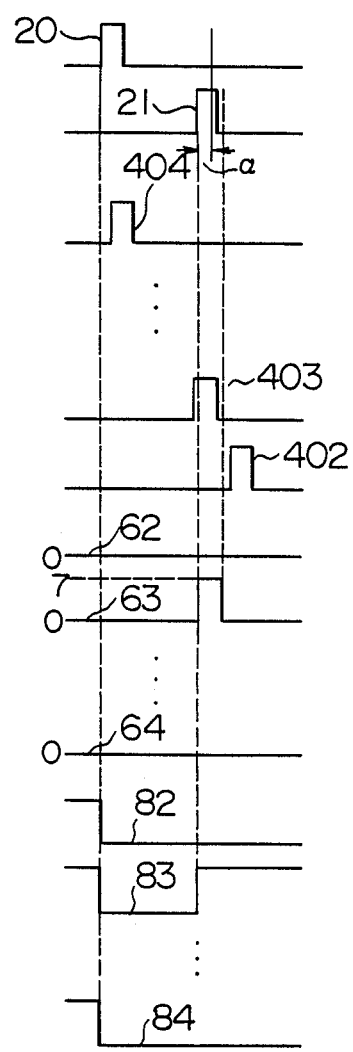
FIG. 6 is a scheme for explaining the correction operation.

Hereinbelow preferred embodiments of this invention will be explained with reference to the drawings. FIG. 1 indicates an example of the construction for realizing this invention. A light beam emitted by a laser light source (e.g. semiconductor laser) 200 is reflected by a galvano-mirror 203 after having been collimated by a lens 201 and passed through a beam splitter 202, and focused in the form of a small light spot on the surface of a recording film of a rotating optical disk 205 by means of a focusing lens 204. When information is recorded, the laser 200 is modulated by information to be recorded and irradiated parts of the recording film are heated locally so that pits are formed there. When the recorded information is reproduced, a relatively weak laser light beam is projected on the disk 205 and light reflected by the disk 205 is separated from irradiation light by means of a beam splitter and taken out. Variations in intensity of this light are detected by a photodetector 207. Here the reference numeral 206 indicates the beam splitter for separating the reflected light coming from the disk into a light beam for reproducing information and a light beam for detecting focusing deviations or track deviations. Since the optical system for detecting focusing deviations and the optical system for detecting track deviations are well-known and since they have no direct relation with this invention, their explanation will be omitted. The light source, the lens, the beam splitter, the galvano-mirror, and the photodetector, etc. are disposed in a box and constitute an optical head. This optical head is so constructed that it is movable in the radial direction of the optical disk. Although this example of the construction illustrates the device for the write-once type disk, this invention can be applied also for the phase-transition type disk, the magneto-optical disk, or if only the information processing system after the signal detection is considered, for the magnetic disk.

Now reproduction of the information is effected by making the beam splitter 202 reflect light reflected by the disk 205 passing through the focusing lens 204 and the galvano-mirror 203 and by receiving light passing through the beam splitter 206 by means of the photodetector 207. After having been transformed into electric signals, the signals are amplified to a desired level by means of an amplifier 208. According to this invention the signals are recorded in the form of elongated pits, whose length is variable, depending on information to be recorded, on the disk, and the lead-edge and the tail-edge of the elongated pits are dealt with as data. The reference numeral 209 represents a circuit for detecting lead-edge and tail-edge. FIG. 2 shows an example of constructions of the circuit 209 for detecting lead-edge and tail-edge. The signals coming from the amplifier 208 are transformed into a two-valued representation by a differential type comparator 300. A threshold value 12 for the two-valued representation is given to the inverted input of the comparator. Each of the two differential outputs is divided into two, one of which is directly inputted in an AND gate 303, 304, and the other of which is inputted in the AND gate after having passed through a delay line 301, 302 and after having been inverted by an inverter 305, 306. Consequently, the output of the AND gate 303 gives a lead-edge detection pulse 13 and the output of the AND gate 304 gives a tail-edge detection pulse 14. Although, in the example indicated in FIG. 2, a differential output type comparator is used, it can be of single output type and in this case, if an inverter is used, inserted in the logic, the circuit can be constructed in the same way.

Now, the lead-edge detection pulse 13 and the tail-edge detection pulse 14 are inputted in the variable frequency oscillators (VFO) 210 and 211, respectively, for self-clock generation and synchronization. The outputs of the VFOs described above are led to the data demodulation starting pattern detection circuits (generally SYNC detection circuits) 212 and 213, respectively. An example of the concrete construction of the detection circuits will be described in the explanation for FIG. 9. Pattern agreement signals 20 and 21 detected by the detection circuits 212 and 213, the lead-edge detection signal 13 and the tail-edge detection signal 14 are inputted in the circuit (correction circuit) 214 performing corrections of the lead-edge and the tail-edge in time. An example of the concrete construction of the correction circuit 214 will be described in the explanation for FIG. 4. The output of the correction circuit 214 is inputted in a demodulation circuit, where demodulation of the data is effected. The circuit and the method for the demodulation can be identical to those used in the prior art techniques.

Here an example of data demodulation starting patterns, which can be used for this invention, will be explained. Data can be coded, modulated and demodulated in many ways. However, in every case, the timing of the data demodulation start should be correctly given. In order to achieve this object, it is necessary for the demodulation starting pattern to fulfill an orthogonal condition. In general, the pattern is detected by shifting it in a shift register by means of clocks generated by the VFO, by implementing an AND operation of outputs of the shift register for every small block (e.g. 4 bits) and by making a decision based on the majority of the outputs of these AND gates. An example of the concrete construction of the circuit for these operations will be described in the explanation for FIG. 9.

The orthogonal condition means that all the outputs of a small block agreement gate are completely identical at a certain point of time. Further it is desirable as an additional condition that the outputs of the agreement gate for every small block are not in agreement except at the point of time, where they are completely identical. For example, in the case of a SYNC pattern consisting of 6 small blocks, for a decision by majority logic recognizing patterns, when more than 4 AND gate outputs are "H", no signal indicating that more than 4 small blocks are in agreement should be produced except at the point of time, where they are completely identical.

Figure 8:
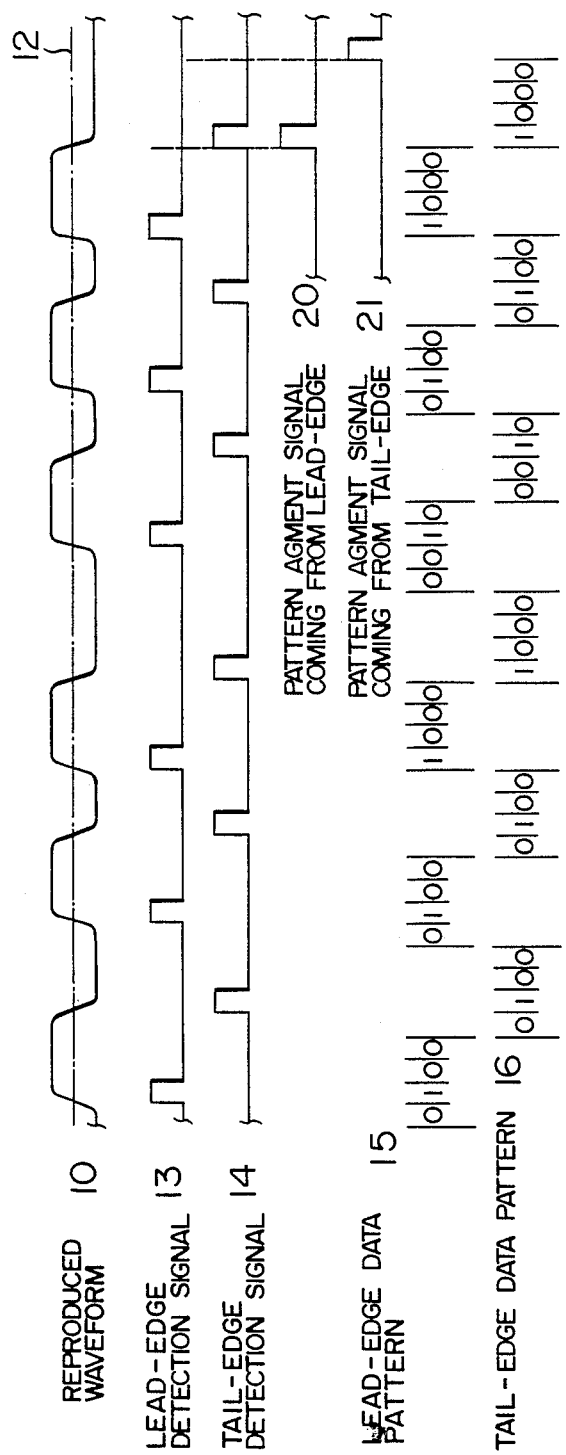
FIG. 8 is a scheme illustrating an example of double demodulation starting patterns.

Then, an example of disk formats for realizing this invention will be explained. FIGS. 3(a), (b) and (c) represent a scheme illustrating an example of these formats. A disk 205 is so constructed that each track is divided into a plurality of sectors and inputting and outputting of data are effected in a unit of these sectors (sector control). At the head of each of these sectors a header signal 500-502 is previously preformated. Although only several headers are indicated in FIG. 3(a), in reality a plurality of headers are disposed all around the disk with an equal interval. FIG. 3(b) is a scheme illustrating the structure of the header portion thus preformated and FIG. 3(c) is a scheme illustrating the structure of the data portion succeeding the header portion. In FIG. 3(b) the sector mark is a pattern indicating the beginning of each sector and it is made usually by using a signal having a frequency distribution, which is lower than the lowest frequency in the spectral distribution of frequency of the data in order to distinguish it from the usual data. Simply it is made by using a pattern consisting of a combination of pits, which are longer than those appearing in the data portion. The SYNC pattern for the self clock generation is a pattern for pulling-in the oscillation of the VFO and is made generally by using a pattern having an interval between the closest pits or an interval between the closest edge among different patterns of the modulation system used. The SYNC pattern is a pattern for ordering the starting of the demodulation of the track number and the sector number succeeding it and fulfills the orthogonal condition described above. Other than this pattern an error correction code (ECC), etc. are often added to the preformat header portion. On the other hand, the data portion in FIG. 3(c) is a domain, where the user writes data at the time of recording, succeeding the header portion. Before the user data also an SYNC pattern for starting the demodulation of the data is recorded at the time of recording the user data together with the data. This SYNC pattern is a fixed pattern independent of the user data. Therefore it is written previously in a ROM and at the time of writing the user data the fixed pattern (SYNC pattern) is read out at first and recorded, and then the user data is recorded. An example of concrete structures of this SYNC pattern is indicated in FIG. 8 and will be explained later. In FIGS. 3(b) and (c), since there is no special restriction concerning the number of bytes for each of the data blocks, their explanation will be omitted.

Figure 7:
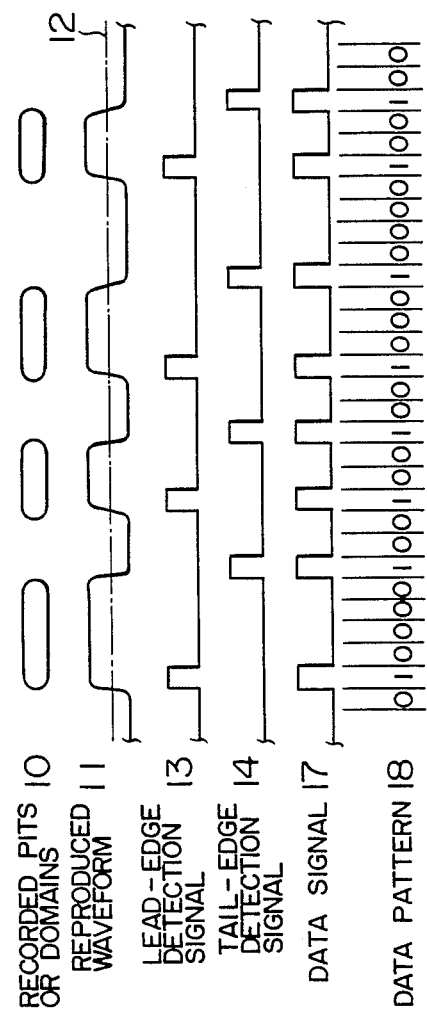
FIG. 7 is a scheme indicating the relation between recorded pits and data signals.

Next, the form of recording/reproduction, for which the lead-edge and the tail-edge of the reproduced waveform are used as data, will be briefly explained. Referring to FIG. 7, a reproduced waveform indicated by 11 is obtained for oval pits or domains indicated by 10. A front edge detection signal 13 and a tail-edge detection signal 14 can be obtained by transforming the reproduced waveform 11 into a two-valued representation by means of a slice level indicated by 12. A series of data indicated by 17 results from a logic sum of the two detection signals. The data signal 17 mentioned above corresponds to "1" and "0" of the two-valued signal, as indicated by a data pattern 18.

Now, in the case where information signals are recorded, it is usual to record the signals on a recording medium after having coded them in some manner. However, when the RLL (run-length-limited) method is used for the coding, a timing mark for indicating the starting point for the demodulation of data is necessary. For the method, by which the central position of a pit corresponds to "1" as it is, so-called pit position method, the pattern for the timing mark can be single-fold. However, for the recording method, by which each of the lead-edge and the tail-edge has a proper signification as data, (pit-edge method) as indicated in FIG. 7, this timing mark pattern can be two-folded.

The single-fold pattern, which is the former, has been already described in Japanese Patent Unexamined Publication No. 169341/83.

FIG. 8 shows an example illustrating doubled timing mark patterns (SYNC patterns recorded in the data portion). The lead-edge signal 13 and the tail-edge signal 14 are obtained by transforming the reproduced waveform 10 into a two-valued representation by means of the slice level 12. When the two detection signals are inputted in two different pattern judgment circuits, respectively, an agreement signal 20 coming from the lead-edge and an agreement signal 21 coming from the tail-edge are produced at positions indicated in FIG. 8, respectively. The agreement signals 20 and 21 can be produced by a method, by which the detection signals 13 and 14 are inputted in a shift register and shifted by reproduction clocks coming from the VFO; the output pattern of the shift register is judged block by block; and finally it is judged to be a timing pattern of starting point, while deciding by majority, obtaining a number of agreement patterns greater than a certain predetermined value. FIG. 9 shows an example of the construction of agreement signal generation circuits corresponding to the mark pattern indicated in FIG. 8. FIG. 9 is the example illustrating the construction of the SYNC detection circuit indicated in FIG. 1. The tail-edge detection signal 14 is inputted in a shift register 311. Reference numerals 311-316 represent shift registers, which are successively connected in cascade and in FIG. 9 constitute a shift register of 48 bits in total. The shift of the signal 14 is effected by a reproduction clock 30. The reproduction clock 30 is a self clock produced by a series of modulated data. The self clock can be produced by inputting the lead-edge detection signal 14 in a VFO (variable frequency oscillator). Then the outputs of the shift registers 311-316 are inputted in AND gates 321-326, respectively, and the pattern agreement for every 4 bits is decided. Taking the case of the AND gate 321 as an example, when the last 4 bits "1000" of the tail-edge data pattern 16 indicated in FIG. 8 are given correctly, the output of the shift register 321 is "H". If all the outputs of the AND gates are "H", the agreement of the pattern is perfect. However, when a majority judgment circuit 331 is used, even if all the block patterns are not in agreement, e.g. more than 4 blocks are in agreement among 6, an agreement signal 21 may be outputted. The majority judgment circuit 331 can be constructed exclusively by gate circuits. However, it is also possible to effect the majority judgment by using a ROM (read-only memory), inputting the outputs of the AND gates 321-326 in an address and writing previously "1" for the data for the addresses, where the number of "1" is greater than 4 among the address bits. Although the case, where the agreement signal 21 coming from the tail-edge is detected, has been indicated in FIG. 9, it is possible in the same way to generate an agreement signal 20 coming from the lead-edge.

As the timing pattern it is also possible to use a large pit length, which does not appear in data pattern as adopted in CD (compact disk).

In the above explanation the working mode according to this invention has been explained on the assumption that the lead-edge and the tail-edge of the reproduced waveform reproduce ideally and correctly the position of "1" during the recording. However, in practice, the position of "1" during the recording is often reproduced incorrectly and the width of the window discriminating information is very small. Consequently, if the demodulation is effected as it is, the probability that errors are produced is high. Therefore, hereinbelow, a method will be described as an embodiment, by which fluctuations of the position of the edges in a series of data succeeding the timing pattern are automatically corrected by using efficaciously the double timing pattern for starting demodulation as described previously.

FIG. 4 shows an example illustrating the construction of correction circuits and more particularly the concrete construction of the correction circuit 214 indicated in FIG. 1. The pattern agreement signal 20 coming from the lead-edge is inputted in a delay line 40. The delay line 40 has a plurality of delay outputs. The delay outputs 401–404 are inputted in AND gates 41–44, respectively. On the other hand, the pattern agreement signal 21 coming from the tail-edge is inputted in a buffer 51 having a delay time, which is equal to that corresponding to one gate of the AND gates 41–44, and in the AND gates 41–44. Then, the outputs 61–64 of the AND gates are inputted in the D (data) terminal of flip-flops 71–74, respectively. Further in the (trigger) terminal of the flip-flops 71–74 is inputted the output 65 of the buffer 51. Here the working mode of the circuit indicated in FIG. 4 will be explained, referring to FIGS. 5(a), (b), (c) and 6. FIGS. 5(a), (b) and (c) are schemes illustrating the production timing of the pattern agreement signal 20 coming from the lead-edge and the pattern agreement signal 21 coming from the tail-edge. FIG. 5(a) illustrates a case where the agreement signal 21 is produced with a delay, which is shorter by $\alpha$ than the proper delay $4\tau$, i.e. an amount of delay corresponding to four clocks; FIG. 5(b) a case where the agreement signal 21 is produced with the proper delay; and FIG. 5(c) a case where the agreement signal 21 is produced with a delay, which is longer by $\beta$ than the proper delay. If it were produced always as indicated in FIG. 5(b), the detection data would be a logic sum of the lead-edge detection signal 13 and the tail-edge detection signal 14 as they are without any correction. However, in the cases illustrated in FIGS. 5 (a) and (c), a series of data should be obtained by forming logic sums after having effected time corrections of $\alpha$ and $\beta$, respectively. FIG. 6 is a scheme illustrating the working mode of the circuit indicated in FIG. 4 for the case of FIG. 5(a). The delayed outputs 401–404 are delayed with a constant time interval. Consequently, for the case indicated in FIG. 6, the delayed output 403 is the delayed output, which can satisfy the AND condition with the agreement signal 21 coming from the tail-edge. Therefore, only the output 63 of the AND gate 43 is "H" at the time of agreement and only the Q output 83 of the flip-flop 73 is "H". That is, in FIG. 4, only the gate 93 is opened among the AND gates 91–94 connected after the flip-flops. On the other hand, the lead-edge detection signal 13 is inputted in a delay line 100 and among its delayed outputs 101–104 only the output 103 passes through the AND gate 93. In FIG. 4, the tail-edge detection signal 14 passes through a fixed delay line 110. This is for the sake of permitting the correction both in the case where the delay of the pattern agreement signal 21 coming from the tail-edge with respect to the pattern agreement signal 20 coming from the lead-edge is shorter than the proper delay of $4\tau$ and in the case where the former is longer than the latter. FIG. 6 shows the case indicated in FIG. 5(a), where e.g. if it is supposed that the circuit is so set that the output 62 of the AND gate 42 is "H" for the proper delay, the Q output 82 of the flip-flop 72 is set at "H" and only the delayed output 102 of the lead-edge detection signal 13 passes through the AND gate. Consequently, if the amount of delay of the delay line 110 for the tail-edge detection signal 14 is equal to the amount of delay of the output 102 of the delay line 100, the difference in time between the lead-edge detection signal 13 and the tail-edge detection signal 14 is outputted without any change. Supposing that the amount of delay of the fixed delay line 110 is $\gamma$; the amount of delay of the output 102 of he delay line 100 is $\gamma$; that of the output 103 is $\gamma - \alpha$; and that of the output 101 is $\beta + \beta$, both the corrections indicated in FIGS. 5(a) and (b) are possible. After having effected the correction in this way, a series of data can be obtained by forming the logic sum of the lead-edge detection signal and the tail-edge detection signal by means of an OR gate 120.

It is also possible to treat the lead-edge and the tail-edge detection signal while inputting them in separate data demodulation circuits without the last OR gate 120.

Further, also in the case indicated in FIG. 5(c) corrections can be effected in the same manner. In addition finer corrections can be effected, if delay lines having smaller intervals between different delay times are used.

The method according to this invention is particularly efficacious, in the case where errors of the lead-edge and the tail-edge detection signals exceed the width of the discrimination window used for the data demodulation. Furthermore, if the errors described above correspond always surely to shifts longer than one clock of the clock for the data demodulation, it is also possible to utilize corrections using the lead-edge and the tail-edge detection signals, which are previously relatively shifted in clock unit, together therewith.

According to this invention, concerning a method for recording and reproducing information by which the lead-edge and the tail-edge of the reproduced waveform are used as data, since it is possible to correct shifts of the interval between the two edges from the proper interval by using double detection signals of the timing mark for starting demodulation, it is possible to obtain effects that reproduction of the information does not depend on fluctuations of characteristics of recording mediums, etc. and that reproduction of data having small edge shifts is possible.

What is claimed is:

1. In a method for recording and reproducing information by which recording domains are formed locally on a recording medium and signals representing a rise and a fall in a reproduced waveform obtained from said recording domains are used as data, the improvement comprising the steps of:

recording first and second timing patterns indicating start of demodulation for a lead-edge and a tail-edge of said recording domains, respectively, at a position before said recording domains on the recording medium;

generating respective first and second timing signals indicating start of demodulation for said lead-edge and tail-edge of said recording domains independently by detecting the rise and fall of reproduced waveforms of said first and second timing patterns; and correcting the time position of said signals representing a rise and a fall in a reproduced waveform of recording domains on the basis of said first and second timing signals to correct for shifts in the rising and falling edges of said recording domains.

2. A method for recording and reproducing information according to claim 1, wherein said timing indicating start of demodulation is constituted by a plurality of divided block patterns.

3. A method for recording and reproducing information according to claim 1, further including detecting a time difference between a timing signal detected from the rise of the waveform and a timing signal detected from the fall of the waveform of said respective timing patterns indicating start of demodulation and correcting shifts of the rising and the falling edge form their proper position in a series of data succeeding said detection signals.

4. A method for recording and reproducing information according to claim I, wherein said recording medium is irradiated with a focused laser beam and said recording domains are formed by heat energy of said laser beam, said reproduced waveform being obtained by using light reflected by said recording medium 5. An apparatus for recording and reproducing information comprising:

a head for forming recording domains on a recording medium depending on information to be recorded and for obtaining a reproduced waveform from said recording medium, depending on said recording domains;

lead-edge and tail-edge detection means coupled with said head for detecting the lead-edge and the tail-edge of said recording domains by using said reproduced waveform and for producing a signal indicating the lead-edge and a signal indicating the tail-edge;

demodulation starting timing signal detection means, coupled to said lead-edge and tail-edge detection means, for detecting independently timing signal patterns for starting demodulation, which timing signal patterns are recorded for the lead-edge and the tail-edge of said recording domains together with said recording domains at a position before said recording domains, respectively, by using said signal indicating the lead-edge and said signal indicating the tail-edge, and for producing separate timing signals for starting demodulation for the lead-edge and the tail-edge of said recording domains based on said detected timing signal patterns; and correction means coupled both to said lead-edge and tail-edge detection means and to said demodulation starting timing signal detection means for detecting a time interval between said timing signals for starting demodulation and for correcting the time interval between said signal indicating the lead-edge and said signal indicating the tail-edge by using said detected time interval between said timing signals for starting demodulation.

* * * * *